April 17, 1945.   L. F. KULESH   2,373,898
WEED PULLER AND CULTIVATOR
Filed Aug. 23, 1944
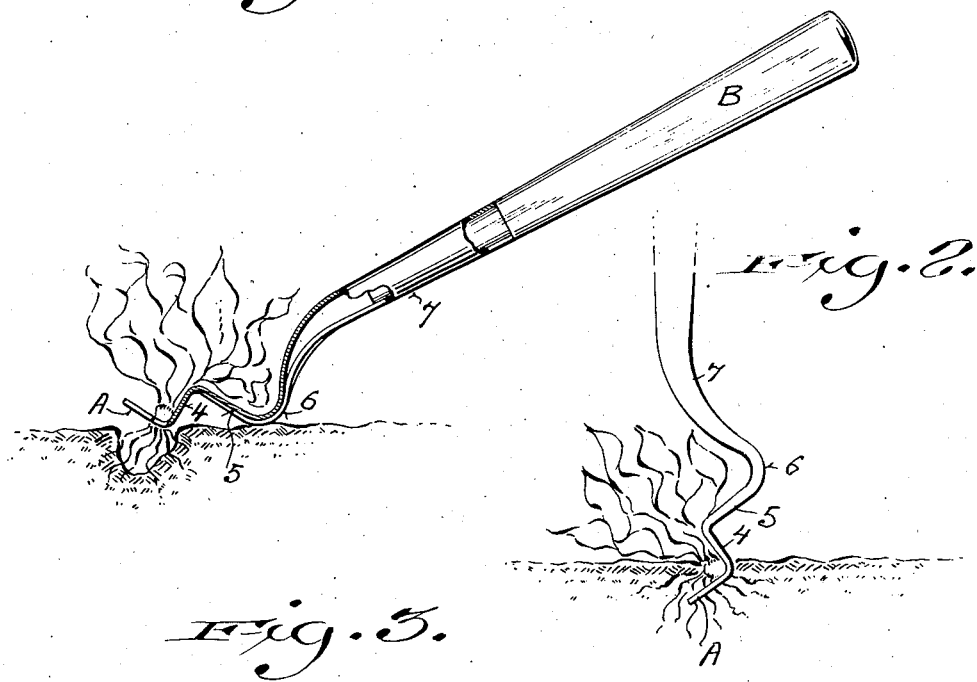
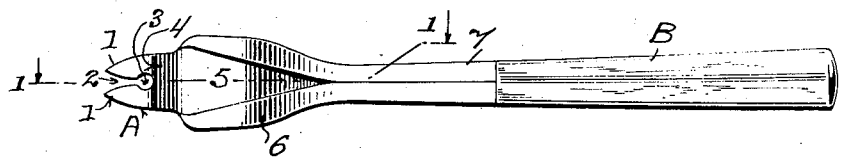
Inventor:
Louis F Kulesh Patented Apr. 17, 1945

2,373,898

UNITED STATES PATENT OFFICE 2,373,898

WEED PULLER AND CULTIVATOR

Louis F. Kulesh, Kenosha, Wis.

Application August 23, 1944, Serial No. 550,732

1 Claim. (Cl. 254—132)

My invention refers to garden tools and its object is to provide a simple and durable combination tool for pulling weeds and for cultivating, the tool being especially adapted for pulling weeds from lawns without damaging the lawn, its construction and arrangement being such that the weed together with its roots is fully extracted.

The specific object of my invention is to provide a double pointed blade formed with an inwardly flared throat terminating with a circular pocket for the reception of the shank of the weed, the blade being thereafter extended upwardly at a right angle to form a weed protecting wall, whereby the danger of severing the weed at the shank is eliminated.

With the above and other minor objects in view, my invention consists in certain peculiarities of construction and combination of parts as will be hereinafter fully set forth with reference to the accompanying drawing and subsequently claimed.

In the drawing:

Figure 1 represents a side elevation of a tool embodying the features of my invention, with parts in section to more clearly illustrate structural features, the section being indicated by line 1—1 of Figure 3.

Figure 2 a similar fragmental side elevation showing the tool in its initial digging position preparatory to an oscillating movement, whereby the weed is extracted, and Figure 3 a bottom plan view of the tool.

Referring by characters to the drawing, A indicates a digging blade formed with a pair of pointed jaws 1—1, which jaws are interrupted by an inwardly flared mouth 2, the same terminating with a circular throat 3 and, as indicated in Figures 1 and 2, the tool is extended upwardly and at a right angle from the blade to form a weed protecting wall 4, which wall is directly back of the throat as shown. The wall at its upper end is folded backwardly at a right angle to the blade A forming a shank 5, which shank is curved at its rear end to form a heel 6. The edges of the shank and heel are folded and extended upwardly to form a tubular handle receiving shank 7.

It will be noted that the tool is formed from a single blank which, by certain die operations, can be readily and cheaply formed into the completed tool, it being noted that the edges of said blank from the shank portion 5 are folded over flatly to form a reinforcement about the heel which is subjected to load strain.

From the foregoing description, as indicated in Figure 2, the blade of the tool is shown entering the earth directly under the weed foliage and the shank of said weed, by a slight push forward, will enter the mouth of the jaws and throat 3, whereby the weed foliage will abut the protecting wall 4. The next operation, as indicated in Figure 1, is to press the handle B downwardly, whereby the heel, as a fulcrum point upon the ground, will cause the blade and its confined weed to be bodily extracted from the earth, bearing in mind during this extraction movement, the foliage or upper part of the weed rests snugly against the wall 4 to eliminate any possibility of the weed being severed from its roots.

It is understood that the tool is applicable for extracting any type of weeds, particularly "plaintain weeds" which are shallow growing, with small roots difficult under ordinary conditions to sever. Obviously the tool is equally efficient in extracting deep rooted dandelions or the like. Furthermore, the tool may be efficiently utilized as a cultivator for loosening the earth about flowers or vegetables.

The drawing illustrates a tool equipped with a short handle which would ordinarily be desirable for use by gardeners or yard men, but in some instances I may substitute for the short handle a long one which would be analogous to a golf club, in which case proprietors of a lawn could use the same in the nature of amusements to extract weeds from the lawn.

This garden tool can also be used effectually as a cultivator tooth, in which case it would be dragged lengthwise of rows of vegetables or flowers.

Changes in details may be made without departing from the spirit or the scope of my invention, but what I claim as new is:

A tool of the character described comprising a flat double pointed blade having a flared inwardly extended mouth terminating with a weed receiving throat, a protecting wall extending upwardly from the throat at a right angle to the blade, a flat shank extending rearwardly from the upper portion of the wall terminating with a rounded heel forming a fulcrum, the heel being extended upwardly with its edges folded over to form a handle receiving ferrule.

LOUIS F. KULESH.